May 8, 1962   A. F. ERICKSON   3,033,183
CYLINDER LINER
Filed May 15, 1961

INVENTOR.
Anton F. Erickson
BY
His Attorney

United States Patent Office 3,033,183
Patented May 8, 1962

3,033,183
CYLINDER LINER
Anton F. Erickson, Dayton, Ohio, assignor to General Motors Corporation, Detroit, Mich., a corporation of Delaware
Filed May 15, 1961, Ser. No. 109,959
6 Claims. (Cl. 123—41.69)

This invention relates to internal combustion engines and is particularly concerned with cylinder liners used in connection with the blocks of said engines.

It is the main object of this invention to provide an improved cylinder liner and block combination at a reduced cost for use in internal combustion engines wherein the liner is formed from sintered ferrous metal and extends only over that section of the cylinder block bore traversed by the piston rings.

In carrying out the above object it is a further object to provide a replaceable cylinder liner of improved material at the lowest possible cost.

Figure 1:
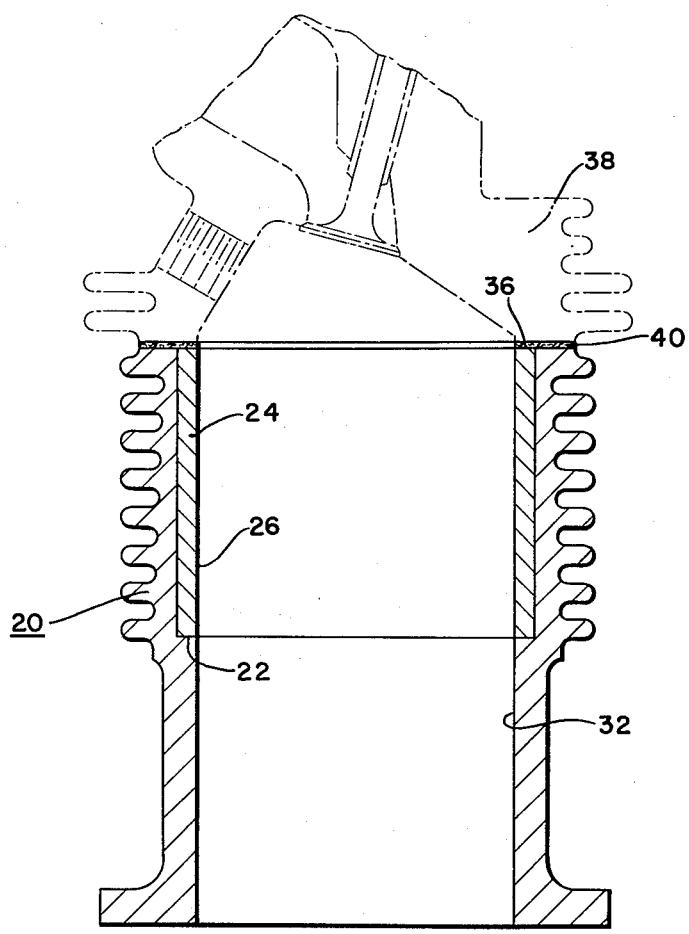

Further objects and advantages of the present invention will be apparent from the following description reference being had to the accompanying drawings wherein FIG. 1 illustrates a cylinder block made from cast aluminum or other suitable material having a cylinder liner in place therein. The cylinder head with valving is shown in phantom.

Figure 2:
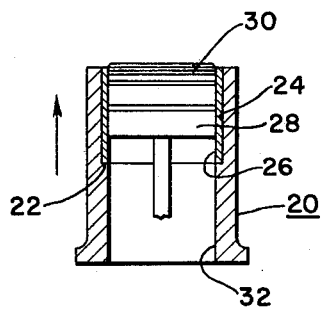
Figure 3:
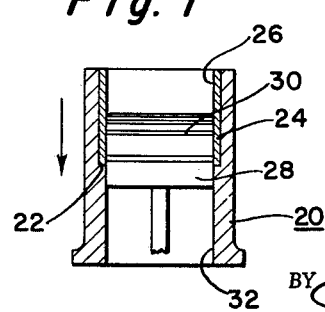

FIG. 2 is a fragmentary view showing the piston in place therein at the upper limit of the piston stroke and FIG. 3 is a view similar to FIG. 2 showing the piston at the lower limit of its stroke.

In copending Kunzog application Serial No. 851,753 filed Nov. 9, 1959, now Patent 3,000,370, granted Sept. 19, 1961, assigned to the assignee of the present invention, a cast-in-place cylinder liner is shown which is formed from sintered ferrous metal. This liner may have valve seats or guides positively related thereto wherein the entire assembly is cast with an aluminum block. Liners, valve seats and guides of this character are highly desirable since they may be made with a high degree of accuracy wherein only a very inexpensive machining operation is requirmed prior to the use thereof. Furthermore, the cylinder liner, due to its porous nature, absorbs some lubricant which improves the wear characteristics thereof. This type of cylinder liner formed from sintered metal is relatively higher in cost than conventional liners due to the extreme accuracy with which it is made. However, use thereof eliminates heretofore necessary machining steps whereby the assembly costs no more and is of greater accuracy.

The present invention is specifically directed to a combination wherein a cylinder liner of high accuracy may be used which is replaceable and which, due to the specific length thereof, is less costly than previously used liners and wherein the liner is held in place by the assembly of the parts of the engine.

The major wear which occurs within an internal combustion engine cylinder is found in the area of the bore traversed by the piston rings. This wear is not uniform throughout the length of the stroke of the piston but appears to be greater at the top of the stroke than at the bottom thereof whereby the cylinder bore increases in diameter from bottom to top with wear. This necessitates replacement of the cylinder liner if one is used or reboring of the cylinder and the use of oversized rings on the piston if no liner is present.

In my invention I propose to utilize a cylinder block 20 of cast aluminum having a ledge or shoulder 22 therein which will act as a stop for a sintered metal cylinder liner 24. The cylinder liner 24 is dimensioned to provide a cylinder wall surface 26 which extends the full length of travel of the piston rings only. In FIGS. 2 and 3 a piston 28 is shown at the upper limit of its travel and in FIG. 3 at the lower limit of its travel. It will be noted that in each instance that the piston rings 30 are within the area encompassed by the cylinder liner 24.

Referring again to FIG. 1, the remainder of the bore of the cylinder 20 as shown at 32 is roughly the same as, or a few thousandths less, than the bore of the cylinder liner 26. This is sufficiently accurate to guide the skirt of the piston to prevent wobble during operation. The upper end of the cylinder liner 24 is shown at 36 and comprises a flat surface which when the cylinder head 38 is in place will be clamped between the cylinder head and the head gasket 40 if one is used and the shoulder 22. This positions the cylinder liner 24 firmly and positively in place. In this instance the liner 24 is preferably a press-fit in the block 20.

After wear of the cylinder liner 24 is such as to necessitate replacement, an "easy-out" or other suitable tool is threaded therein and the liner is pulled or pressed outwardly of the block and a new liner is substituted therefor. When new rings are used on the piston, the assembly has substantially the same clearances and operating efficiency as a new assembly.

The use of an abbreviated or shortened liner lessens tremendously the cost of the liner and likewise facilitates the removal thereof over liners which extend the full length of the cylinder. The cost of the full length liner is nearly double the cost of the present liner and when expensive material such as sintered iron is being utilized, this is substantial. Another difference concerns the ease with which the present liner may be removed. Due to its short length the forces needed for removal are lessened whereby the liner may be removed without danger of injury to the block used.

The present set-up improves cylinder cooling. In an air cooled engine, the cylinder liner acts as a partial insulator between the piston and the block. Since the piston is generally formed from aluminum and the block is formed from aluminum considerable heat may be conducted therethrough at portions where no insulating material such as the iron liner is present. In the present instance the skirt of the piston being of aluminum is in contact with the lower aluminum portion of the block whereby greater piston cooling due to improved conduction of heat is obtained than when the liner extends the full length of the cylinder bore. This is particularly important in air cooled engines.

One other factor which makes the shortened cylinder liner particularly desirable concerns the manufacturing problems that arise during the briquetting of porous metal articles. In such an article, where the length to diameter ratio is large, it is difficult to fill the die uniformly and it is particularly difficult to briquette the article so that a uniform density is obtained from one end to the other thereof. Furthermore, after the article has been briquetted, ejection from the die is extremely difficult due to the friction between the briquetted article and the walls of the die. When making the shortened porous metal liner these problems are all lessened appreciably whereby greater ease of manufacture is apparent and wherein the article itself is of a more uniform density and generally stronger throughout.

While the embodiments of the present invention as herein disclosed, constitute preferred forms, it is to be understood that other forms might be adopted.

What is claimed is as follows:

1. In a cylinder block assembly, for an internal combustion engine including a removable cylinder head and a reciprocating skirted piston including at least two spaced piston rings thereon, the combination comprising, a cylinder block formed from cast aluminum and having a bore extending within said block formed with two concentric different diameters therein with a shoulder therebetween, a sintered iron cylinder liner removably fitted into the larger diameter portion of said bore and abutting said shoulder, the inner diameter of said liner being substantially equal to the smaller diameter portion of said bore for forming a substantially continuous cylinder wall therewith when the liner is in place, said liner extending within said cylinder bore a distance only slightly greater than the distance traversed by said piston rings, whereby the piston rings bear against the liner during normal reciprocation of the piston, the skirt of the piston being guided by the unlined portion of the cylinder bore, said liner being clamped against said shoulder by said cylinder head.

2. The assembly claimed in claim 1 wherein cooling fins are cast on the outside of said block and extend thereon only through that portion which is adjacent the said liner.

3. The assembly claimed in claim 1 wherein the cylinder block has a substantially uniform thickness throughout.

4. In an internal combustion engine including a cylinder head, a cylinder block assembly for use with a reciprocating piston of predetermined stroke having piston rings thereon, the combination comprising, a cast aluminum shell having a bore therethrough, relatively thin metal liner for said bore removably positioned therein, said liner only extending within said bore over that portion traversed by the piston rings, and means for positively positioning said liner within said bore.

5. The assembly claimed in claim 4 wherein the said liner is clamped against displacement when the cylinder head is attached to the block.

6. The assembly claimed in claim 4 wherein the said liner is sintered metal.

References Cited in the file of this patent

UNITED STATES PATENTS

| | | |
|---|---|---|
| 1,311,242 | Norton | July 29, 1919 |
| 2,012,739 | Brown | Aug. 27, 1935 |
| 2,673,131 | Kistler | Mar. 23, 1954 |

FOREIGN PATENTS

| | | |
|---|---|---|
| 400,579 | Great Britain | May 3, 1934 |

Notice of Adverse Decision in Interference

In Interference No. 93,437 involving Patent No. 3,033,183, A. F. Erickson, Cylinder liner, final judgment adverse to the patentee was rendered Feb. 12, 1964, as to claims 1, 2, 3, 4, 5 and 6.

[*Official Gazette April 28, 1964.*]